Nov. 20, 1962 P. N. BOSSART 3,065,347
RADIANT ENERGY DETECTORS
Filed Jan. 7, 1960 3 Sheets-Sheet 3

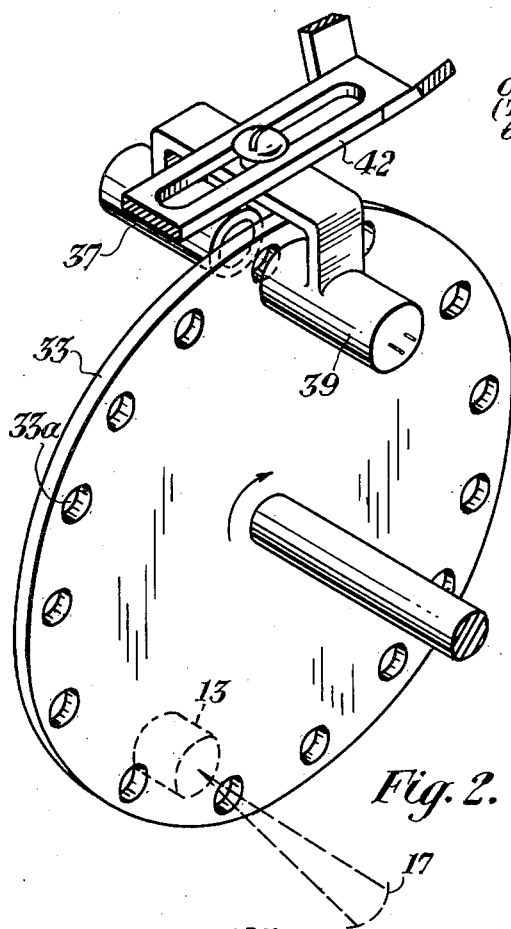
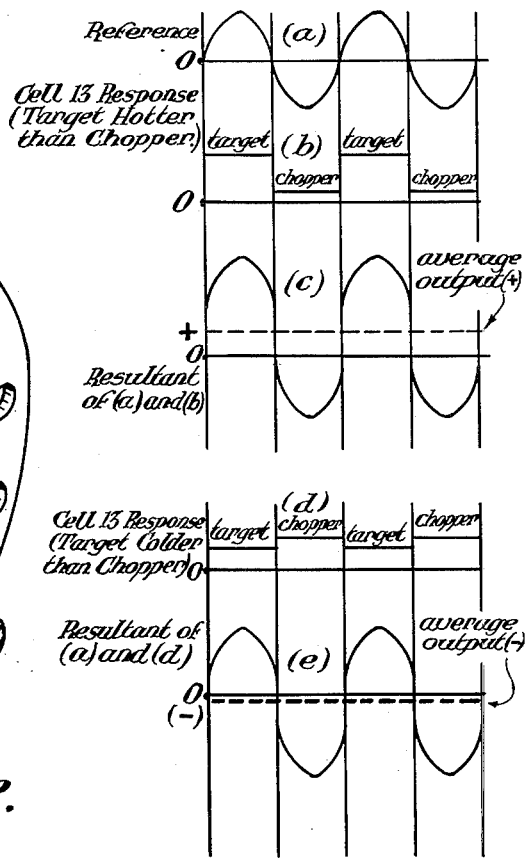
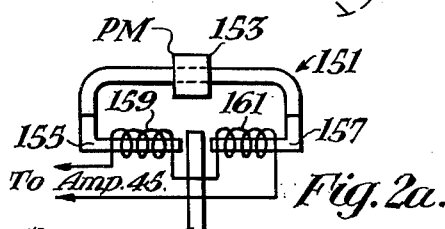
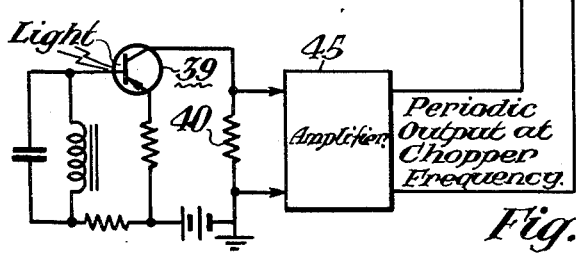
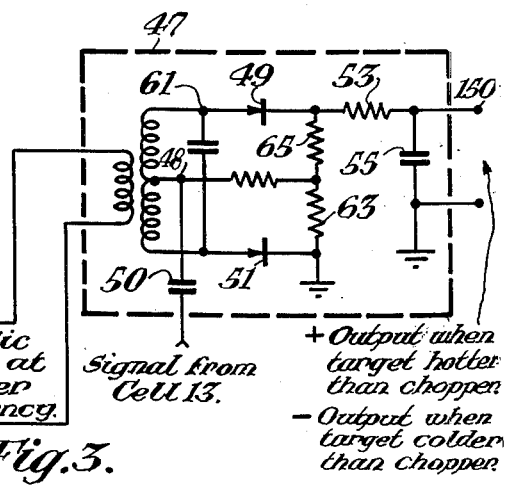

INVENTOR.
Paul N. Bossart.
BY
W. L. Stout.
HIS ATTORNEY

United States Patent Office 3,065,347
Patented Nov. 20, 1962

3,065,347
RADIANT ENERGY DETECTORS
Paul N. Bossart, Cheswick, Pa., assignor to Westinghouse Air Brake Company, Wilmerding, Pa., a corporation of Pennsylvania
Filed Jan. 7, 1960, Ser. No. 1,100
14 Claims. (Cl. 250—83.3)

The present invention relates to a radiant energy detecting apparatus and more particularly to an improved apparatus and circuitry for determining the temperature of wheel bearings.

The copending application Serial No. 829,272 of P. N. Bossart and T. J. Blocher Jr., filed on July 24, 1959, entitled Radiant Energy Detector discloses an overall system for detecting, analyzing and indicating overheated wheel bearings on railroad cars. The present invention discloses a modification to the apparatus and circuitry of the foregoing application to provide a means of improving the signal to noise ratio and assure that the temperature of each wheel bearing is compared against ambient temperature.

Recent advances in the sensitivity of heat sensitive cells such as photoconductive cells, photovoltaic cells, and photoelectromagnetic cells for detecting radiant energy, that is, infrared radiation from low temperature sources have made it commercially feasible to sense the temperature of the bearings of a moving train by apparatus located along the track wayside. The foregoing heat sensitive or detector cells respond directly to certain ranges or quanta of heat radiation and the speed of response may be in the order of less than one to ten microseconds. The rapid speed of response of the cells assures that the signal obtained by an associated system is independent of the exposure time of the cell to the source of radiant energy, that is, the system is substantially independent of the speed of the moving trains.

In one particular embodiment of my invention, the radiant energy detecting device or detector comprises an indium antimonide photoconductive cell. The detector cell employed in my invention needs to be especially sensitive since it is arranged to accept radiation from a target other than the hot bearing itself. As is known, a journal box encloses the railroad car wheel bearings, so that the cell is arranged to receive radiation from either the journal box, the axle, or the wheel at a point somewhat removed from the bearings themselves. It has been found that bearing temperatures of from 300° to 400° F. are dangerous; however, due to the large temperature gradients existing from the bearings to a point on the journal box cover or on the wheel, the temperature to which the photoconductive cell is exposed may be much lower. Because of a lower intervening thermal impedance a more representative indication of the actual temperature of the bearings is obtained by viewing a spot on the wheel at a point close to the axle than is obtained by viewing the journal box.

In the aforementioned application, Serial No. 829,272, as well as in a number of other devices with which I am familiar, a rotatable chopper wheel is mounted to alternately admit and reject radiation from a target to the detector cell. Since the radiation is alternately admitted and rejected, an alternating output signal is obtained which permits the use of alternating current amplifiers instead of direct current amplifiers which, as is known, are relatively unstable at lower power levels because of so called "drift."

In determining whether a bearing is hot the temperature of the bearing should be compared with the ambient temperature. Thus, the true indication of the temperature of a wheel bearing, as measured by the radiation signal, should be the algebraic difference between the signal received when the cell is in effect looking at a target equivalent to ambient temperature, and the signal received from a bearing itself. However, it has been found that when the radiated signal is interrupted by a chopper, the temperature to which the observed radiation is compared may not be the ambient temperature, but rather it may be the temperature of the chopper wheel itself. If the chopper wheel is heated in any way, say by the heat due to the motor or by being mounted within a heated enclosure, the chopper wheel may be at a temperature above outside ambient temperature, and the detector cell will provide a relatively negative signal when it is observing ambient temperature. If the ambient temperature provides a negative phase signal (colder than the chopper) while the bearing provides a positive phase signal (hotter than the chopper), the difference signal will be the absolute sum of the two signals instead of the desired algebraic difference. Thus, the temperature of the bearings must be compared to the true ambient temperature and not to the temperature of the chopper wheel.

It has also been found that noise due to, for example, the vibration caused by the passing wheels, 60-cycle random signals, etc., tends to contaminate the signal output from the detector cell and seriously hampers the operation of the detector unit.

Accordingly it is a principal object of my invention to provide an improved radiation detection apparatus.

It is another object of my invention to provide an improved apparatus for comparing the temperature of a hot bearing against ambient temperature.

It is another object of my invention to provide an improved apparatus for detecting overheated wheel bearings including phase synchronization for reducing or cancelling the noise component in the output signals.

It is another object of my invention to provide an improved apparatus for detecting hot wheel bearings in which the temperature of a chopper is effectively cancelled.

In the attainment of the foregoing objects I provide a unit for detecting radiant energy emanating from the bearings of wheels of passing railroad cars comprising, means for focusing the radiant energy onto a radiation or heat sensitive cell through the apertures of a rotating chopper wheel. I provide a periodic voltage generator and means for comparing the phase of the periodic voltage with the phase of the signal from said cell. Means are provided for obtaining a first combined signal when the cell is viewing a target heated by the bearings; a direct current voltage is developed having a polarity depending on whether the target being viewed is hotter or colder than the chopper and having an amplitude depending on the temperature difference thereof. A second combined signal is obtained when the cell is viewing, say, the underside of a car, or an ambient temperature target; a direct current voltage is developed having a polarity and amplitude depending on the same factors as above. Alternatively, the second combined signal may be obtained by combining the ambient and chopper temperatures directly. Amplitude comparing means compare the first and second combined signals by algebraic subtraction for effectively cancelling the reference signal output of the cell and for comparing the signal due to radiant energy emanating from a wheel bearing with the signal due to radiant temperature from an ambient target. The comparative signal then is proportional to target temperature rise above ambient temperature.

The overall advantages of my invention are first, an improvement in the signal due to noise ratio, and second, that the signal due to the radiant energy emanating from the chopper is cancelled and the temperature of the wheel bearings is compared against external ambient temperature.

Other objects and advantages of my invention will become apparent from the following description taken in connection with the accompanying drawings in which like reference characters refer to like elements throughout and in which:

FIG. 2 is an enlarged detailed view of a periodic signal generator comprising the chopper apparatus as shown in FIG. 1;

FIG. 2a is a modification of the periodic signal generator of FIG. 2;

FIG. 3 is a schematic diagram of a photosensitive transistor and a phase sensitive comparator used in the circuitry of FIG. 1;

FIG. 4 shows wave forms useful in explaining the cooperation of the chopper, the photosensitive transistor and the phase sensitive comparator.

Figure 1:
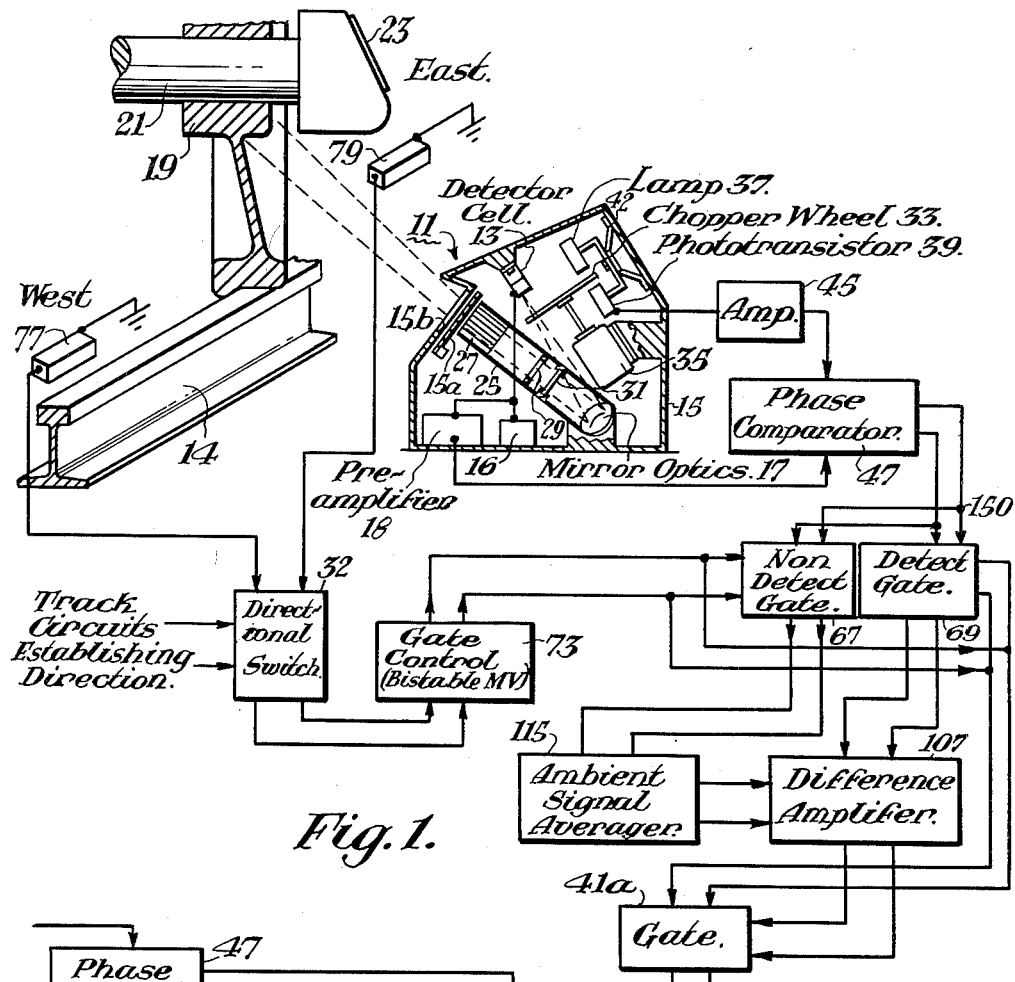
FIG. 1 is an elevational view partly in cross section of the structure of a hot bearing detector according to my invention and including an electronic signal processing circuit shown in block form.

Referring to FIG. 1, a radiant energy detecting unit 11 including a heat or radiation sensitive detector cell 13, comprising indium antimonide is contained within a housing 15. Housing 15 may be mounted on any suitable support adjacent the track rail 14 independent of the railway track. As indicated above, radiation received from a small area on the outside of a car wheel close to the axle provides a representative indication of the temperatures of the bearing. Therefore, detecting unit 11 is mounted in a position such that detecting cell 13 receives the radiation emanating from an area of approximately four square inches on a car wheel 19 at a point immediately beneath the axle 21 which axle is journaled on bearings mounted in the journal box 23.

Unit 11 includes a tube 25 having a phankill entrance 27 approximately 3″ in diameter consisting of a number of small individual tubes, each having a diameter of approximately 0.2 inch, mounted as a honeycomb two inches deep, for purposes explained hereinbelow. A pair of radiant energy filters 29 and 31 are mounted in the tube 25 for purposes which will be explained hereinbelow. Mirror optics 17 of any suitable known construction are mounted at the lower end of tube 25 to receive radiation admitted through the phankill entrance 27 of tube 25. Mirror optics 17 reflect the radiant energy impinging thereon through apertures in the periphery of a chopper wheel 33 to the detector cell 13 mounted on the upper side of housing 15. Chopper 33 is rotated by a suitable type motor 35, preferably of the synchronous type.

Heat sensitive detector cell 13 is connected to a source of electrical power 16, of any suitable type, and the output of cell 13 is converted into an electrical signal by a preamplifier 18, also of any suitable known type.

For purposes to be explained hereinbelow, a source of light or lamp 37 is mounted on one side of the chopper wheel and is arranged by means of an adjustable clamp or bracket 42 to pass its light through apertures 33a in the chopper wheel 33 to a photosensitive transistor 39, of any suitable known type, also mounted on bracket 42 and positioned on the opposite side of the chopper wheel 33.

A cover 15a is biased by a spring, not shown, to a closed position and closes apertures 15b until associated track circuitry of any suitable type known in the art registers that a train is in the associated track section. The track circuitry then acts to open cover 15a.

Unit 11 is mounted below the level of rail 14 so that tube 25 and mirror optics 17 are oriented upward at an angle of from 45° to 60° relatively to the horizontal and substantially perpendicularly to the rail in plan view. (For convenience in drawing the relative dimensions and positions of unit 11, rail 14 and wheel 19 are not to accurate scale in the figures.) Positioning unit 11 in this manner provides the least obstructed view from tube 25 and mirror optics 17 to a point on the wheel adjacent the axle. In this embodiment detector cell 13 is mounted on the upper side of housing 15; however, the detector cell 13 can be mounted at any point at which the mirror optics 17 will focus the radiant energy.

The phankill entrance 27 in tube 25 and the filters 29 and 31 prevent sunlight from energizing the detector cell 13. The phankill entrance honeycomb 27 limits the diameter of the radiant energy beams entering tube 25 and collimates the beams, thus restricting the beams accepted to 0.1 radian or less than 6°. Heat energy due to sunlight tending to enter tube 25 at an angle more than a few degrees off of the axis of tube 25 will be absorbed or reflected and will not pass to cell 13. Obviously, the passing wheels themselves and the underside of the passing cars will tend to shield the tube 25 and cell 13 from direct sunlight energy. In the rare case when sunlight is in a direct line with tube 25, a billboard or other type mask might be mounted on the opposite side of the track rails from unit 11 to shield tube 25 from direct sunlight. Ordinarily this is not required.

Filter 29 will cut off or filter those light waves shorter than one micron (which includes all visible light) while filter 31 which is of a material not suitable to exposure to the weather elements and direct sunlight, cuts off or filters light waves up to 3 microns in length. Thus the two filters 29 and 31 decrease the amount of sunlight energy present to only a very small percentage in the range of wave lengths shorter than 3 microns, but pass heat energy having longer wave lengths for detecting temperatures in the range from about 0° to 200° F.

Chopper wheel 33, shown in more detail in FIG. 2, is rotated by motor 35 at a desired velocity to provide, for example, a 1,000-cycle per second signal. Obviously, apertures or holes 33a and the solid portions of the periphery of the chopper wheel 33 function to alternately admit and reject radiation from a target to the detector cell 13. As noted above, by employing a chopper to interrupt the radiation impinging on the cell 13, an alternating signal is obtained which permits the use of alternating current amplifiers instead of direct current amplifiers which are relatively unstable at lower power levels.

In one preferred embodiment of my invention the chopper wheel 33 interrupts both the radiant energy impinging on detector cell 13 and the light from a lamp 37 falling on photosensitive transistor 39. Bracket 42 permits lateral adjustment of the lamp 37 and the phototransistor 39 along the periphery of the chopper 33. The combination of chopper 33, lamp 37 and phototransistor 39 provides a reference periodic signal generator and permits phase synchronization of the signal output from cell 13. The lamp 37 and phototransistor 39 are adjusted such that a positive phase of the reference signal is provided by phototransistor 39 concurrently as radiant energy is being passed through an aperture 33a in chopper 33 to cell 13. Referring now to FIG. 3, phototransistor 39 and the associated circuitry may be of any conventional suitable type and therefore, it will only be briefly described. As is known, when light impinges on the phototransistor 39, it will conduct and current will flow through a load resistor 40, causing the upper terminal of resistor 40 to be less negative or more positive. When the light impinging on transistor 39 is interrupted, phototransistor 39 will become nonconducting and the upper terminal of resistor 40 will become more negative. Obviously, since the light from lamp 37 to phototransistor 39 is chopped by the rotation of chopper wheel 33, a periodic output voltage will be developed across load resistor 40. The output of resistor 40 is connected to a suitable low frequency amplifier 45 of any known type.

Another suitable structure for developing a periodic signal to establish a phase reference would be an induction generator as shown in FIG. 2a. In this structure, the periodic signal would approximately be a sinusoidal voltage. A C-shaped structure 151 has a permanent magnet 153 mounted in the bight of the C-shape, and the free ends 155 and 157 of the structure are of soft iron and form a small gap therebetween. Coils 159 and 161 are connected in series with one another and each coil is mounted on one of the free ends 155 and 157. The coils are connected to the amplifier 45, see FIG. 1. In this modification, the chopper wheel 33' is of ferromagnetic material, and that portion of the chopper wheel 33' having the apertures formed therein is arranged to rotate in the gap between the free ends 155 and 157. As is known, as the apertures and the solid portion of the chopper wheel alternately move past the free ends 155 and 157, the magnetic flux in structure 151 is interrupted and provides a periodic signal in coils 159 and 161 which is connected to amplifier 45.

Also, other suitable structures for modulating the incoming radiant energy are, of course, known in the art, for example, vibrators or semiconductor modulators.

The output of amplifier 45 is in turn coupled to a phase comparator or phase detector 47 of any suitable type. A similar phase comparator is shown in, for example, page 387 of Pulse and Digital Circuits by Millman and Taub, published by the McGraw-Hill Book Company, 1956. The signal from cell 13 and preamplifier 18 is also coupled through a capacitor 50 to comparator 47.

Since the comparator 47 is conventional and is not per se a part of the invention its operation will only be briefly described. As a result of a periodic input voltage from amplifier 45, direct current will flow in diodes 49 and 51 in alternate half cycles of the input voltage. The combined output voltage is then a periodic full-wave output which is integrated by the RC network comprising a resistor 53 and capacitor 55 and provides a zero output voltage. The signal from cell 13 is coupled through capacitor 50 to the common lead 48 of the circuit meshes of diodes 49 and 51 such that the signal appears with the same polarity to each of the diodes. As noted above, the response time of cell 13 is very fast and the cell reaches its peak output almost instantaneously relative to the 1000-cycle time interval. If a positive pulse or signal from cell 13 occurs during the first half or positive cycle of the periodic reference wave signal (as seen at point 61) and earlier than zero phase of the periodic reference wave signal, diode 49 will conduct more heavily than normal due to the combined signal appearing at its anode. A relatively high positive signal will be developed across resistor 65. This causes the average value of the output voltage integrated by capacitor 55 and resistor 53 as seen at point 150 to be positive. Likewise, if the higher amplitude signal or pulse from cell 13 occurs during the second half or negative portion of the periodic wave input to phase comparator 47, the output voltage will be a negative direct current voltage since in this case diode 51 will conduct more heavily and current flow through the output resistor 63 will be in a direction relatively reversed to the flow of current through output resistor 65.

The operation of the chopper 33, the phototransistor 39 and the phase comparator 47 is shown graphically in FIG. 4. The periodic reference signal due to lamp 37 and phototransistor 39 is shown in FIG. 4a as a sinusoidal wave; however, the reference signal may be a square wave; the important point is, of course, that it be periodic. Assuming that the target (the element from which cell 13 is receiving radiant energy) provides a signal indicating that the target is hotter than the chopper as shown in FIG. 4b, the resultant of the two signals will be a positive direct current voltage, FIG. 4c. In considering the resultants of FIG. 4c and FIG. 4e, note that due to the connection of the signal output from cell 13 to common lead 48, the signal due to the chopper temperature adds to the absolute value of the reference signal.

Assuming, however, that the target is colder than the chopper, FIG. 4d, then the resultant will be a negative direct current voltage, FIG. 4e. Thus, by proper adjustment of lamp 37 and phototransistor 39 a target hotter than the chopper wheel 33 provides a positive output voltage while a target colder than chopper 33 provides a negative signal. It should, of course, be understood that due to the changing intensity of radiation impinging on cell 13, the positive and negative signals shown for purposes of explanation in FIG. 4, will actually be in the form of positive or negative pulses for the hot target indication and an approximate D.C. level for ambient measurement.

It has been found that phase comparison of phase synchronization as described above greatly improves the signal-to-noise ratio of the electrical signal output from the detector unit 11. This is due to the fact that random noise, such as caused by vibration, if measured over a relatively long time, is constant during both halves of the periodic reference signal obtained above, and will be cancelled out in the phase comparator 47. In other words, the phase comparator subtracts the noise components from each other during the two halves of the periodic signal whereas if a full-wave rectifier were employed the average of the absolute values of noise would appear as an output.

Figure 5:
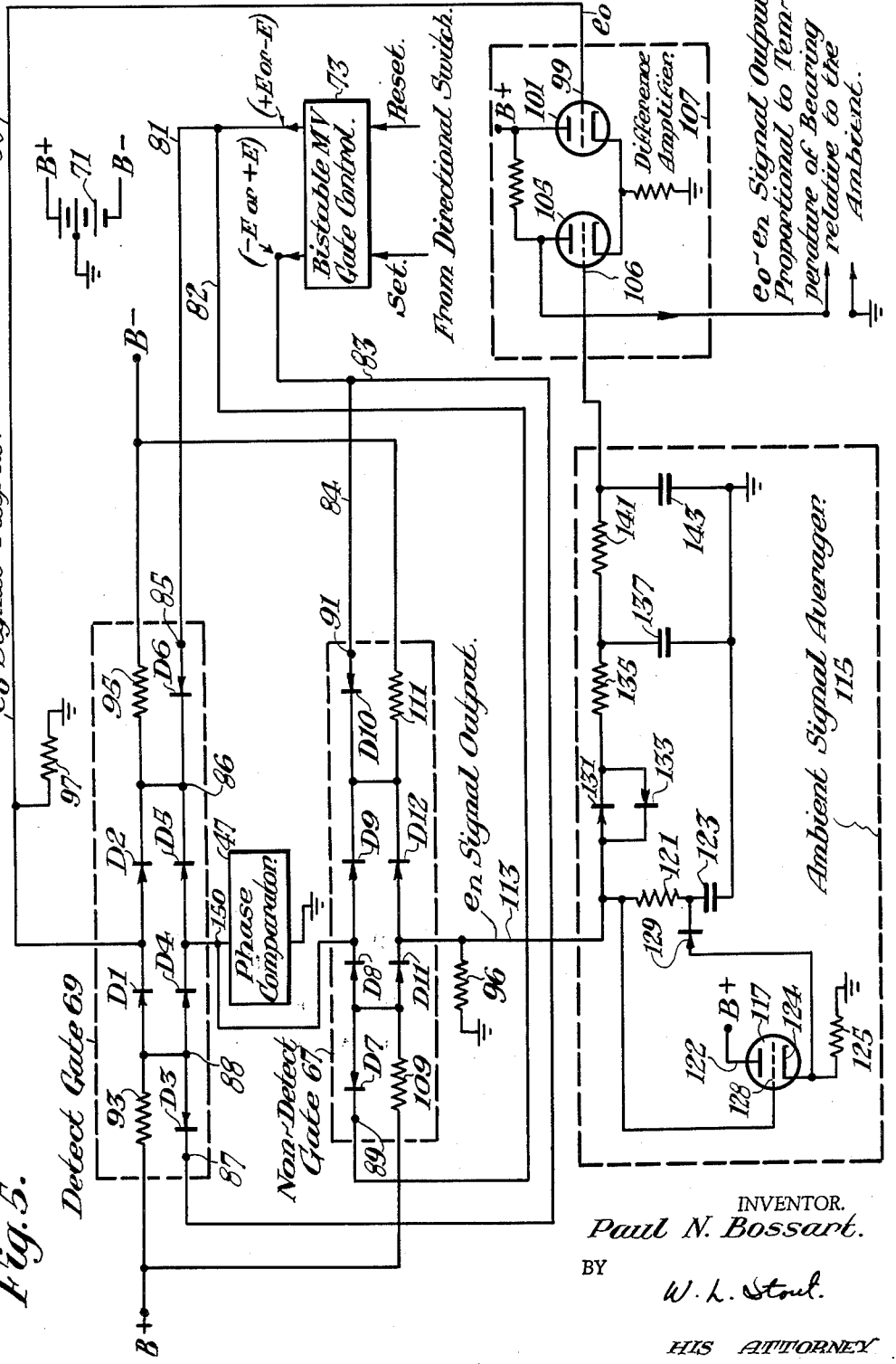
FIG. 5 is a schematic diagram of the gating system used in the circuitry of FIG. 1.

The output from the phase comparator 47 is coupled in parallel to a nondetect gate 67 and a detect gate 69, see point 150 in FIGS. 1, 3 and 5. The signal output from cell 13 due to the temperature of chopper 33 is added to the output of the phase sensitive comparator 47 during both the detect and nondetect periods. Since the signal due to temperature of the chopper 33 is added to the signals during both detect and nondetect periods the overall effect is that the signal due to the chopper temperature cancels from the output. Mathematically, this can be expressed as:

$$b - a = d$$

where:

$b$ = bearing temperature signal
$a$ = ambient temperature signal
$d$ = difference and if a constant $x$ is added to both $b$ and $a$, the identity remains $$(b+x) - (a+x) = d$$

where $x$ = chopper temperature signal (the chopper temperature is assumed to be relatively constant).

The details of one type of gates 67 and 69 which may be employed are shown in FIG. 5. This type of gates is known in the art and described, for example, on page 445 of Pulse and Digital Circuits by Millman and Taub, published by the McGraw Hill Book Company, 1956. Since the details of gates 67 and 69 are per se not a part of the invention, their operation will be only briefly described.

The biasing or operating voltages B+ and B− are obtained from a suitable source shown as a battery 71. Referring to FIG. 5, as well as FIG. 1, the control voltages +E or −E are coupled to nondetect gate 67 and detect gate 69 in parallel from a bistable multivibrator gate control 73 to open and close these gates alternately as will be explained in more detail hereinbelow. Gate control 73 is actuated by a directional switch 32 which in turn is energized by wheel inductors 77 and 79. Wheel inductors 77 and 79 may be of any well known type and operate to provide a pulse upon the passage of a wheel thereover. Associated track circuits, not shown, of any suitable known type, establish the direction of movement of the train. For example, a train moving from west to east energizes wheel inductor 77 which actuates switch 32 such that the output of switch 32 will shift the conducting condition of bistable multivibrator gate control 73 to provide a negative output, —E, through lead 81 to point 85 in detect gate 69 and through lead 82 to point 89 in nondetect gate 67. Also a poistive output, +E, is provided through lead 83 to point 87 in detect gate 69 and through lead 84 to point 91 in nondetect gate 67. As the train wheel passes the second inductor 79, directional switch 32 actuates the bistable multivibrator gate control 73 to shift its conducting condition to provide a positive output, +E, through lead 81 to point 85 in detect gate 69 and through lead 82 to point 89 in nondetect gate 67. Also a negative output, —E, is provided through lead 83 to point 87 in detect gate 69 and through lead 84 to point 91 in nondetect gate 67.

When the control voltages impressed at points 85 and 87 are —E and +E, respectively, diodes D3 and D6 are back biased and nonconducting, and detect gate 69 is open for transmission. Since B+, the positive battery potential, is connected to the anodes of diodes D1 and D4 through resistor 93, and B—, the negative battery potential, is connected to the cathodes of diodes D2 and D5 through resistor 95, diodes D1, D2, D4 and D5 are in a low impedance condition. Consequently, the signal voltage from phase comparator 47 is coupled through these conducting diodes to load resistor 97. The output appearing across load resistor 97 is connected through lead 98 to the grid 99 of a triode 101 which is one half of a difference amplifier 107. Amplifier 107 is of a conventional known type and is shown, for example, on page 20 of Pulse and Digital Circuits by Millman and Taub, published by McGraw Hill Book Company, 1956.

At this time when the control voltages at points 85 and 87 in detect gate 69 are —E and +E, respectively, the control voltages at points 91 and 89 in nondetect gate 67 are +E and —E, respectively. This causes diodes D7 and D10 to be in a low impedance condition and diodes D8, D11, D9 and D12 to be back biased. At this time the signal voltage from phase comparator 47 will be prevented from passing to output resistor 96.

During the periods when car wheels are not in the viewing sector of detector unit 11, that is, during the interval between the time when bistable multivibrator 73 has been "reset" until it is again "set" by the presence of a succeeding wheel, a negative output —E will be connected through lead 84 to point 91 in nondetect gate 67 and a +E voltage will be coupled to point 89 in gate 67. Diodes D7 and D10 will be back biased. Since B+ is connected to the anodes of diodes D8 and D11 through resistor 109, and B— is connected to the cathodes of diodes D9 and D12 through resistor 111, diodes D8, D9, D11 and D12 are in a low impedance condition. Consequently, the signal output from phase comparator 47 is connected through these conducting diodes to a load resistor 96. The output appearing across load resistor 96 is coupled through lead 113 to an ambient signal averager 115.

At this time, the control voltages at points 85 and 87 in detect gate 69 are +E and —E, respectively. This causes diodes D6 and D3 to be in a low impedance condition and diodes D1, D2, D4 and D5 to be back biased, and the signal voltage from phase comparator will be prevented from passing to resistor 97 and difference amplifier 107.

In FIG. 5, signal $e_o$ is the output of phase comparator 47 during the detect time, that is, during the time cell 13 is receiving radiant energy from the car wheel indicative of the temperature of the wheel bearing, and signal $e_n$ is the output signal of phase comparator 47 during the time cell 13 is receiving radiant energy from targets other than from the wheel bearings, i.e., from the external ambient temperature. Signal $e_o$ is coupled to difference amplifier 107 directly while signal $e_n$ is coupled through an ambient signal averager 115 to a difference amplifier 107.

Averager 115 comprises a clipper circuit and three integrating networks as follows. A resistor 121 is connected in series with a capacitor 123 and the two are connected in parallel with the input of amplifier 107. The time consent of resistor 121 and capacitor 123 is relatively fast, about 0.03 second. To prevent a momentary increase in received radiant energy from increasing the average signal level, a triode 117 is connected to discharge capacitor 123. Anode 122 of triode 117 is connected to B+, control grid 128 is connected to the upper terminal of resistor 121, and the cathode 124 is connected through a diode 129 to the junction of capacitor 123 and resistor 121. The cathode 124 is also connected through a resistor 125 to ground. The resistance of resistor 125 is relatively much lower than the resistance of resistor 121. Should the voltage impressed across resistor 121 and capacitor 123 suddenly increase, the increased voltage appearing on grid 128 will cause triode 117 to conduct heavily. This will, of course, cause an increase current flow through resistor 125 and will forward bias diode 129. Capacitor 123 will then be quickly discharged through resistor 125 to ground.

The second integrating network consists of series connected resistor 135 and parallel connected capacitor 137 which have a time constant of about 0.5 second. A pair of diodes 131 and 133 are connected with opposing polarities in parallel with each other and in series with resistor 135. Diodes 131 and 133 permit capacitor 137 to charge relatively fast, but the nonconducting threshold of the diodes prevents the capacitor 137 from discharging completely. The final integrating network consists of a series connected resistor 141 and parallel connected capacitor 143 which have a time constant of about 10 seconds. As is obvious, the purpose of averaging network 115 is to average the signals due to ambient temperature. As noted, the output of averaging network 115 is coupled to the grid 106 of triode 105 in difference amplifier 107. As is known, output of the difference amplifier 107 will be a signal which is the difference between the signal output of phase comparator 47 during the detect time minus the averaged signal output of the comparator 47 during the nondetect time or $e_o - e_n$.

The output signal is coupled through a gate 41a to signal processing circuits as described in the aforementioned Serial No. 829,272.

Figure 1A:
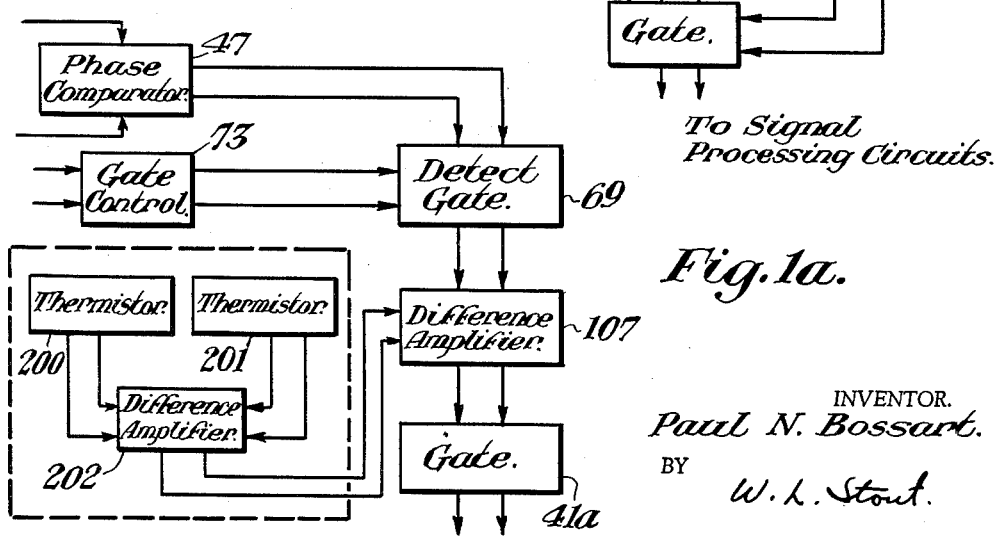
FIG. 1a is a modification of the circuitry shown in FIG. 1.

In the system of FIG. 1, the difference in the intensity of radiant energy received by detector cell 13 when it is viewing the target and when the detector is viewing the ambient temperature is compared with the intensity of radiant energy received when the detector cell 13 is receiving radiant energy from the chopper wheel 33. FIG. 1a shows a modification of the system of FIG. 1 in which the indications of the chopper temperature and of the ambient temperature are obtained directly. FIG. 1a is similar to FIG. 1 with the exception that the nondetect gate 67 and the ambient signal averager 115 are not employed in FIG. 1a; and in addition, FIG. 1a shows two thermistors or thermocouples 200 and 201 and a difference amplifier 202 not used in the circuit of FIG. 1. Thermistor 200, any suitable type, is arranged to provide an electrical output indicative of the external ambient temperature. Thermistor 201, which may be similar to thermistor 200, is arranged to provide an electrical output indicative of the chopper temperature. The output from the thermistors 200 and 201 are fed to a first difference amplifier 202 and a first difference signal output is obtained. The ambient temperature is thus compared against the chopper temperature directly. The output from amplifier 202 is connected to a second difference amplifier 107 to be combined with the output of phase comparator 47 to obtain a second difference signal indicative of the temperature rise above ambient of the target point on the wheel.

The output of amplifier 107 is fed through gate 41a to the signal processing circuit as in FIG. 1.

To briefly summarize, one advantage of my circuit is that a marked improvement is provided in the signal-to-noise ratio of the system. Without the phase synchronization the noise due to the vibrations caused by the passing train and random 60-cycle hum tend to mask the signal output of the detector cell. A second advantage of my invention is that the temperature of the chopper is effectively cancelled and the output of the cell is compared against ambient temperature, thereby providing a better indication of the relative temperature of the wheel bearings.

Although I have herein shown and described only one form of apparatus embodying my invention, it will be understood that various changes and modifications may be made therein within the scope of the appended claims without departing from the spirit and scope of my invention.

Having thus described my invention, what I claim is:

1. In a device for detecting overheated wheel bearings, the combination comprising, a heat sensitive cell for developing an output in response to target radiant energy impinging thereupon, means for periodically interrupting the radiant energy impinging on said cell, means utilizing the output of said cell for providing a first signal representative of the difference of the temperature of a wheel bearing and the temperature of said interrupting means, means for providing a second signal representative of the difference of the temperature of said interrupting means and the temperature of the targets other than said wheel bearings, and means for comparing the amplitude of said first and second signals whereby any noise components in said signals are reduced and the component of the signal due to the temperature of said interrupting means is cancelled and the signal due to radiant energy emanating from a wheel bearing is compared to the external ambient temperature.

2. In a device of detecting overheated wheel bearings, the combination comprising, a heat sensitive cell for developing an output in response to target radiant energy impinging thereon, and hence for providing a signal representative of the temperature of the source of radiant energy, means for focusing external radiant energy onto said cell, chopper means for chopping the radiant energy focused onto said cell, means utilizing the output of said cell for providing a voltage having a polarity dependent on the relative temperature of said chopper as compared with the temperature of the targets from which the cell is receiving radiant energy, means for selectively gating said voltage for providing a first signal representative of the temperature of a wheel bearing and the temperature of said chopper, means for providing a second signal representative of the temperature of said chopper and the external ambient temperature, and means for comparing the amplitude of said first and second signals for reducing the noise components in said signals and for cancelling the component of the signal due to said chopper temperature to compare the signal due to radiant energy emanating from a wheel bearing with the external ambient temperature.

3. In a device for detecting overheated wheel bearings, the combination comprising, a heat sensitive cell for developing an output in response to radiant energy impinging thereupon, a means for focusing radiant energy from targets onto said cell, chopper means for chopping the radiant energy focused onto said cell, means for providing a first signal representative of the chopper temperature, means providing a second signal representative of the external ambient temperature, means for combining said first signal with the output developed by said cell when said cell is receiving radiant energy emanating from a wheel bearing for providing a first combined signal, means for combining said first and second signals for providing a second combined signal, and means for comparing the amplitude of said first and second combined signals whereby any noise components in the signals are reduced and the effect of said first signal is cancelled and the signal due to radiant energy emanating from a wheel bearing is compared with said second signal.

4. In a device for detecting overheated wheel bearings, the combination comprising, a heat sensitive cell for developing an output in response to radiant energy impinging thereupon, means for focusing radiant energy emanating from passing wheel bearings onto said heat sensitive cell, chopper means for chopping the radiant energy focused onto said cell, means for converting the outputs of said cell into electrical signals, means for generating a reference voltage, means for comparing the phase of said reference voltage with the signals from said cell for providing an indication of the relative amplitudes and polarity of a first signal output from said cell due to external radiant energy as compared with a second signal output from said cell due to radiant energy emanating from said chopper, means including said phase comparing means combining said second signal output with the signal developed by said cell due to radiant energy emanating from a wheel bearing for providing a first combined signal, means including said phase comparing means combining said second signal output with said first signal output for providing a second combined signal, and means for comparing the algebraic amplitude of said first and second combined signals for effectively cancelling said second signal output and for comparing the signal due to radiant energy emanating from a wheel bearing with the signal developed by said cell when said cell is receiving external radiant energy other than from a wheel bearing.

5. In a device for detecting overheated wheel bearings, the combination comprising, a heat sensitive cell for developing an output in response to radiant energy impinging thereupon, a rotatable chopper wheel having a plurality of spaced apertures formed therein, means for focusing radiant energy emanating from passing wheel bearings through said apertures onto said heat sensitive cell, means for converting the outputs of said cell into electrical signals, means including said chopper for generating a periodic voltage, means for comparing the phase of said periodic voltage with the signals from said cell for developing a direct current voltage having a polarity dependent on the amplitude of a first signal output from said cell due to external radiant energy impinging on said cell as compared with a second signal output from said cell due to radiant energy emanating from said chopper, amplitude comparing means, first means for gating the output from said phase comparing means to said amplitude comparing means during the time said cell is receiving radiant energy from said chopper and a wheel bearing, and second means for gating the output from said phase comparing means to said amplitude comparing means during the time said cell is receiving radiant energy from said chopper and from the external ambient temperature, said amplitude comparing means providing an output signal wherein the noise components in the signals are reduced and the signal component due to said chopper temperature is cancelled.

6. In a device for detecting overheated wheel bearings, the combination comprising, a heat sensitive cell for developing an output in response to radiant energy impinging thereupon, a rotatable chopper wheel having a plurality of spaced apertures formed therein, means for focusing radiant energy emanating from passing wheel bearings through said apertures onto said heat sensitive cell, means for converting the output of said cell into electrical signals, means including said chopper for generating a periodic phase reference voltage, phase comparing means for comparing said reference voltage with the signal from said cell for providing a direct current voltage having a polarity dependent on the relative amplitude of a first signal output from said cell due to external radiant energy as compared with a second signal output from said cell due to radiant energy from said chopper, a pair of gate means, means connecting the signal output of said phase comparing means in parallel to said gate means, means for comparing the amplitude of the signal output from one of said gate means with the amplitude of the signal output from the other of said gate means, means for energizing the first of said gate means for passing the signal from said phase comparing means to said amplitude comparing means when said cell is receiving radiant energy emanating from said wheel bearings, means for energizing the second of said gate means for passing the signal from said first phase comparing means to said amplitude comparing means when said cell is receiving radiant energy other than from said wheel bearings, and said amplitude comparing means comparing the signals passed through said two gates whereby the noise component in the signals is reduced and whereby the temperature of the wheel bearings is compared against the external ambient temperature and the signal component due to said chopper temperature is cancelled.

7. In a device for detecting overheated wheel bearings, the combination comprising, a heat sensitive cell for detecting radiant energy, a rotatable chopper wheel having a plurality of apertures formed thereon, means for focusing radiant energy emanating from passing wheel bearings through the apertures in said chopper wheel onto said heat sensitive cell, means for converting the output of said cell into electrical signals, a source of light mounted on one side of said chopper wheel, a photosensitive transistor mounted on the other side of said chopper wheel, said chopper wheel interrupting the light from said source received by said transistor for developing a periodic reference voltage output, phase comparing means for comparing the reference output of said photosensitive transistor with the signal from said cell for providing a direct current voltage with a polarity dependent on the relative amplitude of the signal from said cell due to external radiant energy and the signal from said cell due to radiated energy from said chopper, a pair of gate means, means connecting the signal output of said phase comparing means in parallel to said gate means, signal amplitude comparing means, means for energizing the first of said gate means for passing the signal from said phase comparing means to said amplitude comparing means during the time said cell is receiving radiant energy emanating from said wheel bearings, means for energizing the second of said gate means for passing the signal from said phase comparing means to said amplitude comparing means during the time said cell is receiving radiant energy other than from said wheel bearings, and said amplitude comparing means providing an output signal which is the difference of the two input signals connected thereto whereby the noise component in the signals is reduced and whereby any signal due to the radiated energy from said chopper is cancelled.

8. In a device for detecting overheated wheel bearings, the combination comprising, a heat sensitive cell for providing an output in response to radiant energy impinging thereupon, a rotatable chopper wheel having a plurality of spaced apertures formed therein, means for focusing radiant energy emanating from passing wheel bearings through said apertures onto said heat sensitive cell, means for converting the output of said cell into electrical signals, means including said chopper for generating a periodic voltage, means for comparing the phase of said periodic voltage with the signal from said cell for providing a direct current voltage having a polarity dependent on the relative amplitude of the signal from said cell due to external radiant energy and the signal from said cell due to radiant energy from said chopper, first thermally responsive means for providing signal representative of the external ambient temperature, second thermally responsive means for providing a signal representative of the chopper temperature, means for comparing the relative amplitudes of the signals from said first and second thermally responsive means for providing a difference signal, signal amplitude comparing means, means for gating a signal from said phase comparing means to said amplitude comparing means when said cell is receiving radiant energy from a wheel bearing, and means for comparing the amplitude of the output signal from said phase comparing means with said difference signal to provide an indication of the temperature of said wheel bearing.

9. In a device for detecting overheated wheel bearings, the combination comprising, a heat sensitive cell for detecting and providing an output in response to radiant energy impinging thereupon, a chopper wheel having a plurality of spaced apertures formed therein, means for rotating said chopper, means for focusing radiant energy emating from passing wheel bearings through said apertures onto said heat sensitive cell, means for converting the output of said cell into electrical signals, means including said chopper for generating a periodic phase reference voltage, phase comparing means for comparing said periodic voltage with the signal from said cell for providing a direct current voltage having a polarity dependent on the relative amplitude of the signal from said cell due to external radiant energy and the signal from said cell due to the radiant energy from said chopper, first thermally responsive means for providing a signal representative of the external ambient temperature, second thermally responsive means for providing a signal representative of the temperature of said chopper, first amplitude comparing means for comparing the amplitude of the signal from said first and second thermally responsive means for providing a difference signal, second amplitude comparing means, means for gating the output from said phase comparing means to said second amplitude comparing means when said cell is receiving radiant energy from a wheel bearing, means for connecting said difference signal to said second amplitude comparing means for providing an output signal indicative of the temperature of said wheel bearings relative to only the extent ambient temperature.

10. In an apparatus for detecting overheated train wheel bearings including a heat sensitive cell, means for focusing radiant energy emanating from passing wheel bearings onto said heat sensitive cell, said cell being receptive to radiant energy from the ambient temperature during the intervals between train wheels, a rotatable chopper wheel having a plurality of spaced apertures formed therein, said chopper wheel alternately passing and interrupting the external radiant energy focused on said cell, and means for converting the output of said cell into electrical signals; the means for cancelling the effect of the signal developed by said cell due to radiant energy from said chopper impinging on said cell, comprising, in combination, a source of light mounted on one side of said chopper, a phototransistor mounted on the other side of said chopper for receiving light from sai dsource interrupted by said chopper for developing a periodic voltage, means for adjusting said source and said phototransistor to develop the positive phase of said sinusoidal voltage concurrently as said cell is receiving radiant energy through an aperture in said chopper and the negative phase of said periodic voltage concurrently as said cell is receiving radiant energy from said surface of said chopper, a phase comparator, means for coupling the signals from said cell and the output of said phototransistor to said phase comparator to provide an output voltage of a polarity dependent upon temperature of said chopper as compared to the external ambient temperature, signal amplitude comparing means, first gate means for gating a first signal output from said phase comparator to said amplitude comparing means when said cell is receiving radiant energy from the external ambient temperature; and second gate means for gating a second signal output from said phase comparator when said cell is receiving energy emanating from said wheel bearings, said amplitude comparing means providing an output which is proportional to the difference between said second signal developed by said cell due to the radiant energy of a wheel bearing plus the radiant energy of the chopper, and said first signal developed by said cell due to radiant energy representative of the ambient temperature plus the radiant energy of the chopper whereby the noise component in the signals is reduced and whereby the component of the signal due to radiant energy from said chopper is cancelled and the temperature of the wheel bearings is compared against the ambient temperature.

11. In a device for detecting overheated wheel bearings of a passing vehicle, the combination comprising, a heat sensitive cell for providing an output in response to radiant energy impinging thereupon, a chopper wheel having a plurality of spaced apertures formed therein, means for receiving radiant energy emanating from wheel bearings and focusing said energy through apertures in said chopper wheel onto said heat cell, means for rotating said chopper at an angular velocity at which a plurality of apertures move past said cell during the time said focusing means is focusing radiant energy from a wheel bearing onto said cell, means for converting the output of said cell into electrical signals, a permanent magnet structure having an air gap therein, coil means mounted on said structure, that portion of said chopper wheel having the apertures formed therein being mounted to rotate through said air gap to disturb the magnetic field in said gap whereby a sinusoidal signal is developed in said coils, phase comparing means, said coils coupling said sinusoidal voltage to said phase comparing means, said phase comparing means comparing said sinusoidal voltage with the signal from said cell for providing a direct current voltage having a polarity dependent on the relative amplitudes of the signal developed by said cell due to external radiant energy and the signal developed by said cell due to radiant energy from said chopper, a pair of gate means, signal amplitude comparing means, means connecting the signal output of said phase comparing means in parallel to said gate means, means for energizing the first of said gate means for passing the signal from said phase comparing means as a first input to said amplitude comparing means during the time said cell is receiving radiant energy emanating from said wheel bearings, means for energizing the second of said gate means for passing the signal from said phase comparing means as a second input to said amplitude comparing means during the time said cell is receiving external radiant energy other than from the wheel bearings, that is, from the ambient temperature, and said amplitude comparing means providing an output signal which is equal to the difference of its two input signals whereby the noise components in the signals are reduced and whereby any signal due to radiant energy emanating from said chopper is cancelled to permit the temperature of said wheel bearings to be compared only to the ambient temperature.

12. In a device for detecting overheated wheel bearings of a passing vehicle, the combination comprising, a heat sensitive cell for providing an output in response to radiant energy impinging thereupon, a chopper wheel having a plurality of spaced apertures formed therein, means for receiving radiant energy emanating from wheel bearings and focusing said energy through apertures in said chopper wheel onto said cell, means for rotating said chopper at an angular velocity at which a plurality of apertures move past said cell during the time said focusing means is focusing radiant energy from a wheel bearing onto said cell, means for converting the outputs of said cell into electrical signals, a source of light mounted on one side of said chopper, a photosensitive transistor mounted on the other side of said chopper for receiving light interrupted by said rotating chopper for developing a periodic phase reference output voltage, phase comparing means for comparing said periodic voltage with the signal from said cell for providing a direct current voltage having a polarity dependent on the relative amplitudes of the signal developed by said cell due to external radiant energy and the signal developed by said cell due to radiant energy from said chopper, a pair of gate means, signal amplitude comparing means, means connecting the signal output of said phase comparing means in parallel to said gate means, means for energizing the first of said gate means for passing the signal from said phase comparing means as a first input to said amplitude comparing means during the time said cell is receiving radiant energy emanating from said wheel bearings, means for energizing the second of said gate means for passing the signal from said phase comparing means as a second input to said amplitude comparing means during the time said cell is receiving external radiant energy other than from the wheel bearings, that is, from the ambient temperature, and said amplitude comparing means providing an output signal which is equal to the difference of its two input signals whereby any noise components in the signals are reduced and whereby any signal due to radiant energy emanating from said chopper is cancelled to permit the temperature of said wheel bearings to be compared only to the ambient temperature.

13. In an apparatus for detecting overheated wheel bearings including a heat sensitive cell, means for focusing the radiation emanating from said wheel bearings to said heat sensitive cell, a rotatable chopper wheel having a plurality of spaced apertures formed therein, means for rotating said chopper wheel to alternately pass and interrupt the external radiant energy impinging on said cell, means for converting the output of said cell into electrical signals, means for cancelling the effect of the signal developed by said cell due to the radiant energy from the surface of said chopper impinging on said cell comprising, in combination, a source of light mounted on one side of said chopper, a phototransistor mounted on the other side of said chopper for receiving light from said source interrupted by said chopper for developing a periodic phase reference voltage, means for adjusting said source and said phototransistor to develop the positive phase portion of said periodic voltage concurrently as said cell is receiving radiant energy through an aperture in said chopper and to develop the negative phase of said periodic voltage concurrently as said cell is receiving radiant energy from the surface of said chopper, a phase comparator, the output of said cell and the output of said phototransistor being connected to said phase comparator, said phase comparator providing a direct current voltage of a positive polarity when the radiant energy from said chopper is of lower intensity than the received external radiant energy and a direct current voltage of a negative polarity when the radiant energy from said chopper is of higher intensity than the received external radiant energy, a difference amplifier, first gate signal integrating or averaging circuit means, means for opening said first gate means to couple the output voltage from said phase comparator through said signal averaging circuit to said difference amplifier when said cell is receiving radiant energy emanating from said difference amplifier when said cell is receiving radiant energy from a target other than said wheel bearings, that is, from the external ambient temperature, second gate means, means for opening said second gate means to couple the output voltage from said phase comparator to said difference amplifier when said cell is receiving energy emanating from said wheel bearings, said difference amplifier providing an output signal which is proportional to the difference between the signal developed by said cell due to the temperature of a wheel bearing and the averaged signal developed by said cell due to the ambient temperature.

14. In a device for detecting overheated wheel bearings of a passing vehicle, the combination comprising, a heat sensitive cell for providing an output in response to radiant energy impinging thereupon, a chopper wheel having a plurality of spaced apertures formed therein, means for receiving radiant energy emanating from wheel bearings and focusing said energy through apertures in said chopper wheel onto said cell, means for rotating said chopper at an angular velocity at which a plurality of apertures move past said cell during the time said focusing means is focusing radiant energy from a wheel bearing onto said cell, means for converting the output of said cell into electrical signals, a permanent magnet structure having an air gap therein, coil means mounted on said structure, that portion of said chopper having the apertures formed therein being mounted to rotate through said air gap to disturb the magnetic field in said gap whereby a sinusoidal signal is developed in said coils, phase comparing means, said coils coupling said sinusoidal voltage to said phase comparing means, said phase comparing means comparing said sinusoidal voltage with the signal from said cell for providing a direct current voltage having a polarity dependent on the relative amplitudes of the signal developed by said cell due to external radiant energy and the signal developed by said cell due to radiant energy from said chopper, means for gating the signal output from said phase comparing means, first thermally responsive means for providing a signal representative of the external ambient temperature, second thermally responsive means for providing a signal representative of the chopper temperature, means for comparing the signals from said first and second thermally responsive means for providing difference signal, means for energizing said gate means for passing a signal from said phase comparing means to said amplitude comparing means when said cell is receiving radiant energy from a wheel bearing, and means for comparing the amplitude of the output signal from said phase comparing means with said difference signal to provide an indication of the temperature of said wheel bearing.

References Cited in the file of this patent
UNITED STATES PATENTS
2,886,970    Munker _____ May 19, 1959